(12) United States Patent
Han et al.

(10) Patent No.: US 12,689,167 B2
(45) Date of Patent: Jul. 21, 2026

(54) INTERFACE APPARATUS FOR DRIVING OPEN PLUGGABLE SPECIFICATION

(71) Applicant: SAMSUNG ELECTRONICS CO., LTD., Suwon-si (KR)

(72) Inventors: Changmin Han, Suwon-si (KR); Gwanhyung Kim, Suwon-si (KR); Yeongjun Kwon, Suwon-si (KR); Minjae Shin, Suwon-si (KR); Huijun Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 18/383,299

(22) Filed: Oct. 24, 2023

(65) Prior Publication Data

US 2024/0055816 A1 Feb. 15, 2024

Related U.S. Application Data

(63) Continuation of application No. PCT/KR2023/007048, filed on May 24, 2023.

(30) Foreign Application Priority Data

May 25, 2022 (KR) ........................ 10-2022-0064362
Aug. 5, 2022 (KR) ........................ 10-2022-0098156

(51) Int. Cl.
*H01R 31/06* (2006.01)
*G06F 13/40* (2006.01)
*H01R 13/66* (2006.01)

(52) U.S. Cl.
CPC ....... *H01R 31/065* (2013.01); *G06F 13/4027* (2013.01); *H01R 13/6691* (2013.01); *G06F 2213/40* (2013.01)

(58) Field of Classification Search
CPC ............ G06F 13/4027; G06F 2213/40; H01R 31/065; H01R 13/6691
See application file for complete search history.

(56) References Cited

U.S. PATENT DOCUMENTS 8,154,569 B2 4/2012 Ford et al.
10,224,727 B2 3/2019 Li et al.
(Continued)

FOREIGN PATENT DOCUMENTS

CN 205265858 U 5/2016
CN 106249832 B 12/2016
(Continued)

OTHER PUBLICATIONS

International Search Report (PCT/ISA/210) issued by the International Searching Authority on Aug. 28, 2023 in International Application No. PCT/KR2023/007048.
(Continued)

*Primary Examiner* — Henry Tsai
*Assistant Examiner* — Christopher A Daley
(74) *Attorney, Agent, or Firm* — Sughrue Mion, PLLC

(57) ABSTRACT

An interface apparatus is disclosed. The interface apparatus includes a substrate configured to perform interfacing of a signal between an electronic device and a display device, the substrate includes a first connector configured to connect with the electronic device, a second connector configured to with the display device, and a power connector configured to receive power, and the substrate is configured to provide power received through the power connector to the electronic device through the first connector.

9 Claims, 6 Drawing Sheets

(56)                    References Cited

U.S. PATENT DOCUMENTS

| | | | | | |
|---|---|---|---|---|---|
| 11,422,602 | B2 * | 8/2022 | Giffen | ........................ | G06F 1/26 |
| 12,417,202 | B2 * | 9/2025 | Wang | ..................... | G06F 13/385 |
| 2014/0016258 | A1 | 1/2014 | Jeong | | |
| 2015/0229228 | A1 | 8/2015 | Rakovsky | | |
| 2016/0085280 | A1 * | 3/2016 | Harel | ..................... | G06F 1/3287 |
| | | | | | 710/14 |
| 2019/0102403 | A1 * | 4/2019 | Schmisseur | ........... | G06F 16/221 |
| 2020/0363852 | A1 | 11/2020 | Choi | | |
| 2021/0072792 | A1 | 3/2021 | DeCamp et al. | | |
| 2021/0081160 | A1 * | 3/2021 | Chang | ................. | G06F 3/1423 |
| 2022/0029366 | A1 * | 1/2022 | Cross | ..................... | G09G 5/003 |
| 2023/0300982 | A1 * | 9/2023 | Leitgeb | ................. | H05K 1/186 |
| | | | | | 174/260 |

FOREIGN PATENT DOCUMENTS

| | | | |
|---|---|---|---|
| CN | 107894935 | A | 4/2018 |
| CN | 109144582 | A | 1/2019 |
| CN | 109976491 | A | 7/2019 |
| EP | 0512438 | B1 | 9/1999 |
| EP | 3840171 | A1 | 6/2021 |
| KR | 1992-0022593 | A | 12/1992 |
| KR | 10-2017-0003486 | A | 1/2017 |

OTHER PUBLICATIONS

Written Opinion (PCT/ISA/237) issued by the International Search-ing Authority on Aug. 28, 2023 in International Application No. PCT/KR2023/007048.

* cited by examiner

1000

300                    100                    200

INTERFACE APPARATUS FOR DRIVING OPEN PLUGGABLE SPECIFICATION

CROSS-REFERENCE TO RELATED APPLICATION(S)

This application is a bypass continuation of International Application No. PCT/KR2023/007048, filed on May 24, 2023, which is based on and claims priority to Korean Patent Application No. 10-2022-0064362, filed on May 25, 2022, and Korean Patent Application No. 10-2022-0098156, filed on Aug. 5, 2022, in the Korean Intellectual Property Office, the disclosures of which are incorporated by reference herein in their entireties.

BACKGROUND

1. Field

The disclosure relates to an interface apparatus, and more particularly, to an interface apparatus that drives an open pluggable specification (OPS) between an electronic device and a display device.

2. Description of Related Art

An open pluggable specification (OPS) is an interface standard for adding a function of a computer to a display device. The OPS is an interface standard published by NEC, INTEL, and MICROSOFT. There may be computers with an interface that satisfies the OPS standard, and the computer may be connected to a display device that supports the OPS interface and adds a function of the computer to the display device by being connected to the display device that supports the OPS interface.

SUMMARY

According to an aspect of the disclosure, an interface apparatus which is attachable to or detachable from a display device, includes: a substrate configured to perform, based on the interface apparatus being mounted to the display device, interfacing of a signal between an electronic device and the display device, wherein the electronic device is attachable to and/or detachable from the display device, wherein the substrate includes a first connector configured to connect with the electronic device; a second connector configured to connect with the display device; and a power connector configured to receive power, and wherein the substrate is further configured to provide the power received through the power connector to the electronic device through the first connector.

The substrate may be further configured to: receive direct current power from an external power supplying device through the power connector; and supply the received direct current power to the electronic device through the first connector.

The substrate may further include a power supply part, the power supply part may include: an alternating current/direct current (AC/DC) converter configured to convert a first current power provided through the power connector to a first direct current power; and a direct current/direct current (DC/DC) converter configured to convert the first direct current power to a second direct current power having a pre-set voltage level, and the substrate may be further configured to provide the second direct current power provided from the power supply part to the electronic device through the first connector.

The power supply part may be configured to receive the first current power from a display power supply part in the display device through the power connector.

The current power provided from the display power supply part may be current power that is bypassed from the display power supply part.

Each of the first connector and the second connector may include at least one from among a universal serial bus (USB) terminal, a high-definition multimedia interface (HDMI) terminal, a display port (DP) terminal, and a universal asynchronous receiver/transmitter (UART) terminal.

The second connector may be configured to connect with the display device through a cable.

According to an aspect of the disclosure, an interface apparatus includes a first connector configured to connect with an electronic device; a second connector configured to connect with a display device; and a power connector, wherein the interface apparatus is configured to: based on identifying the interface apparatus is connected to the display device and the electronic device, perform an interfacing of a signal between the electronic device and the display device; and provide power received by the power connector to the electronic device through the first connector.

The second connector may be a cable.

The interface apparatus may include a power supply part that receives an input of alternating current (AC) power from a display power supply part disposed on the display device.

The first connector and the second connector may be connected using at least one from among universal serial bus, high-definition multimedia interface, a display port, and a universal asynchronous receiver/transmitter.

According to one or more embodiments, a structure of the display device may be simplified and component costs reduced by removing a power part for supplying power to the electronic device from the display device.

The effects of the disclosure are not limited to the above-mentioned effects, and other effects that are not mentioned herein should be clearly understood to one of ordinary skill in the art from the description below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
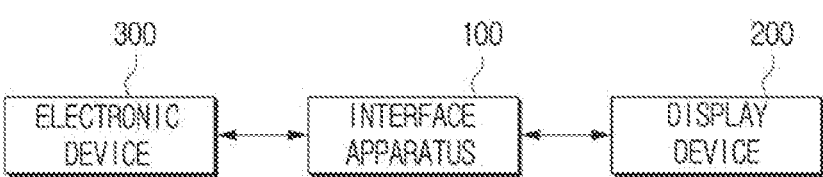
FIG. 1 is a diagram illustrating an interface apparatus that connects an external device, according to an embodiment.

Various embodiments will be described in greater detail below with reference to the drawings. Embodiments described herein may be variously modified. A specific embodiment may be illustrated in the drawings and described in detail in the detailed description. However, any specific embodiment illustrated in the drawing is only to assist in the easy comprehension of the various embodiments. Accordingly, it should be noted that the embodiments of the disclosure are not limited by the specific embodiments illustrated in the drawings, and should be interpreted to include all modifications, combinations, equivalents and/or alternatives of the embodiments included in the spirit of the disclosure and in the technical scope.

Terms including ordinal numbers such as first and second may be used in describing various elements, but the elements are not limited by the above-described terms. The above-described terms may be used only for the purpose of distinguishing one element from another element.

In the disclosure, terms such as "have" or "include" are used herein to designate a presence of a characteristic, number, step, operation, element, component, or a combination thereof, and not to preclude a presence or a possibility of adding one or more of other characteristics, numbers, steps, operations, elements, components or a combination thereof. When a certain element is indicated as being "coupled with/to" or "connected to" another element, it may be understood as the certain element being directly coupled with/to the another element or as being coupled through other element. On the other hand, when a certain element is indicated as "directly coupled with/to" or "directly connected to" another element, it may be understood as the other element not being present between the certain element and the another element.

Terms such as "module" or "part" for elements used in the disclosure may perform at least one function or operation. Further, a "module" or a "part" may perform a function or operation implemented in a hardware, a software, or a combination of hardware and software. In addition, a plurality of "modules" or a plurality of "parts," except for a "module" or a "part" which needs to be implemented to a specific hardware or in at least one processor, may be integrated to at least one module. A singular expression includes a plural expression, unless otherwise specified.

An information (e.g., data) transmission process that is performed in the disclosure may be applied with encryption or decryption according to necessity, and expressions describing the information (e.g., data) transmission process in the disclosure and the claims are to be construed as including encryption/decryption even if not mentioned separately. Expressions of the form "transmit (transfer) from A to B" or "receive from B by A" in the disclosure may include being transmitted (transferred) or received with another medium included therebetween, and may not necessarily describe being transmitted (transferred) or received directly from A to B.

In the disclosure, only the essential elements necessary in describing the disclosure have been described, and elements not related to the nature of the disclosure have been omitted. Further, the disclosure is not to be construed in an exclusive sense including only the recited elements, but to be interpreted in a non-exclusive sense where other elements may be included.

Throughout the disclosure, the expressions "at least one of a, b, or c" or "at least one of a, b, and c" indicates only a, only b, only c, both a and b, both a and c, both b and c, or all of a, b, and c.

The electronic devices and apparatuses described herein may include one or more processors and one or more memories.

In addition, in describing the disclosure, in case it is determined that the detailed description of related known technologies or configurations may unnecessarily confuse the gist of the disclosure, the detailed description thereof will be omitted. Each embodiment may be independently implemented or operated, but each embodiment may also be implemented or operated in combination thereof.

FIG. 1 is a diagram illustrating an interface apparatus that connects an external device, according to an embodiment.

Referring to FIG. 1, an interface apparatus 100, a display device 200, and an electronic device 300 are shown. The interface apparatus 100 may be attached and/or detached to and from the display device 200 and the electronic device 300. In addition, the interface apparatus 100 may be implemented to be included in the display device 200, and attached to and detached from the electronic device 300. When the display device 200 and the electronic device 300 are connected through the interface apparatus 100, the interface apparatus 100 may transmit a signal of the display device 200 to the electronic device 300, and transmit a signal of the electronic device 300 to the display device 200. That is, the interface apparatus 100 may perform interfacing of the signal between the display device 200 and the electronic device 300.

For example, the display device 200 may include a monitor, a television (TV), and the like, and the electronic device 300 may include a desktop computer, a laptop computer, and the like. The above-described examples are merely one or more example embodiments, and the disclosure is not limited to the above-described examples.

In a related art, OPS is a standard for adding a computer function to the display device. When the display device is used as OPS, the display device may be required to supply power to the electronic device 300. Accordingly, the display device 200 may be required to include a power supply part larger in capacity than that of the related art or include a sub power supply part separate from a main power supply part. The display device which supports OPS may be used in a method according to the related art. In this case, the display device may include an unnecessary power supply part. In other words, the display device may have a disadvantage of components increasing and manufacturing costs rising because of having to include a power supply part or a sub power supply part that supplies power of a large capacity to support the OPS function.

According to one or more embodiments, components of the display device 200 may be reduced and manufacturing costs cut back by supplying power to the electronic device 300 through the interface apparatus 100.

Various examples of the interface apparatus 100 will be described below.

FIGS. 2 to 5B are diagrams illustrating an interface apparatus according to one or more embodiments.

In FIGS. 2 to 5B, the interface apparatus 100 providing power supplied from an external power supplying device 400 to the electronic device 300 according to one or more embodiments is shown.

Figure 2:
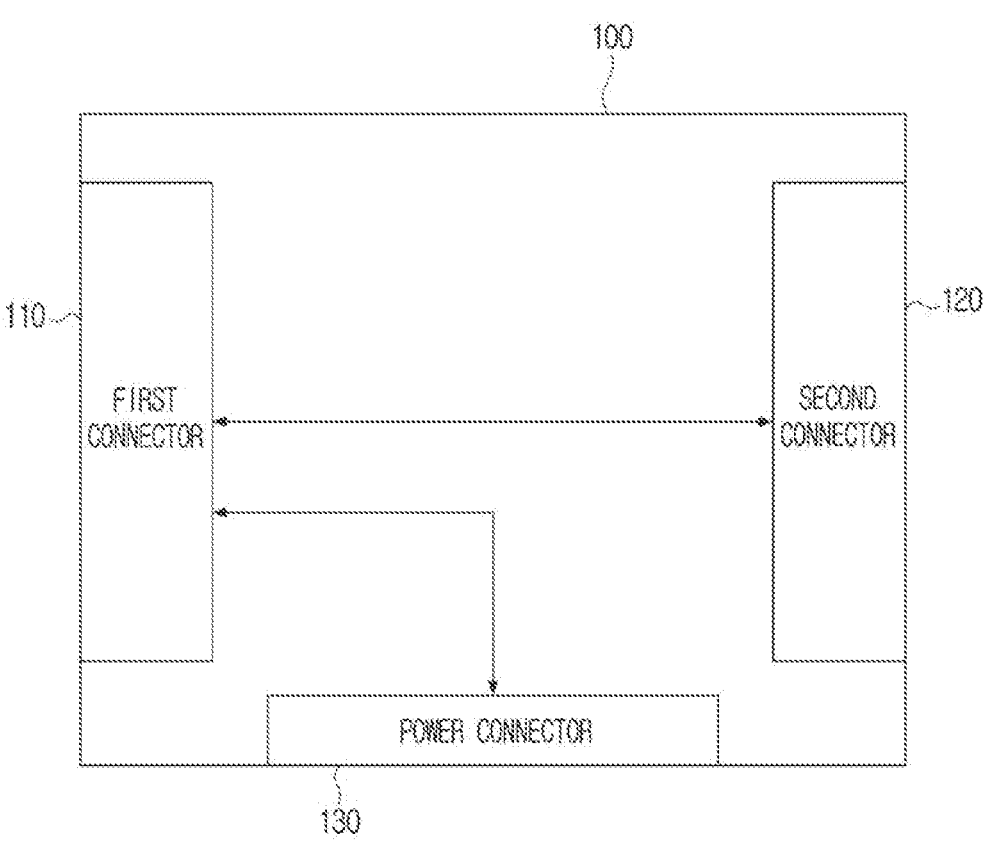
FIG. 2 is a diagram illustrating an interface apparatus with a mounted substrate that performs interfacing of a signal between a display device and an electronic device, according to an embodiment.
Figure 3:
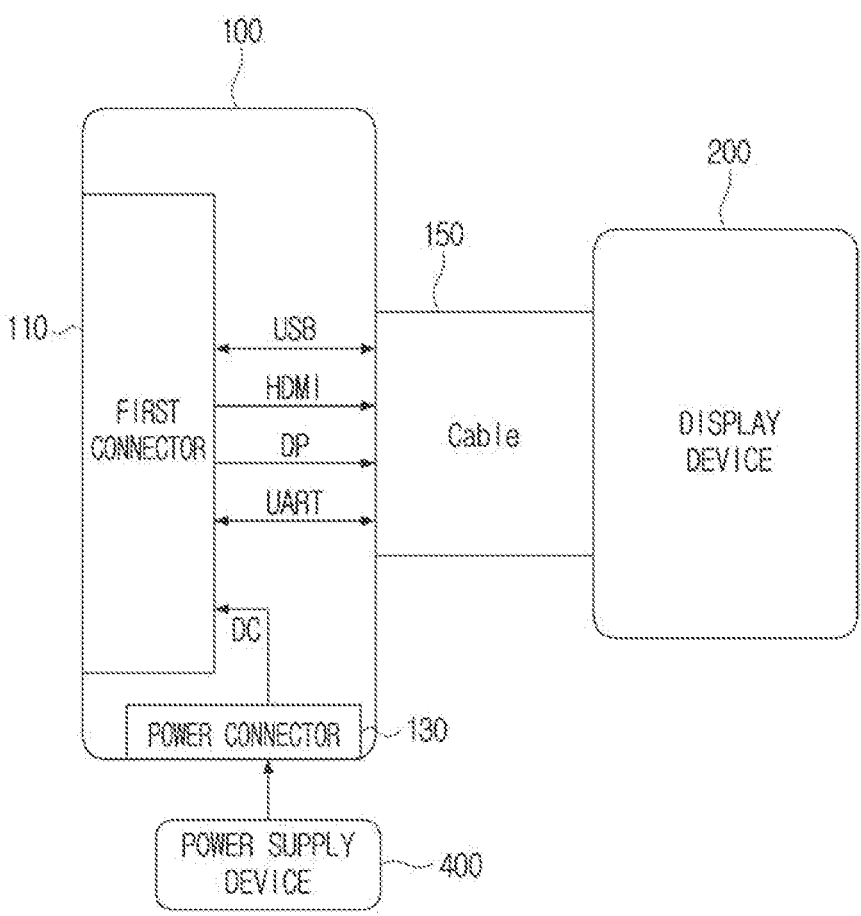
FIG. 3 is a diagram illustrating an interface apparatus connected with a display device via a cable, according to an embodiment.

First, an example illustrated in FIG. 2 and FIG. 3 is described.

FIG. 2 is a diagram illustrating an interface apparatus with a mounted substrate that performs interfacing of a signal between a display device and an electronic device, according to an embodiment. Referring to FIG. 2, the interface apparatus 100 may include a mounted substrate which performs interfacing of a signal between the display device 200 and the electronic device 300. On the substrate, a first connector 110 which is connected with the electronic device 300, a second connector 120 which is connected with the display device 200, and a power connector 130 which receives power may be included.

FIG. 3 is a diagram illustrating an interface apparatus connected with a display device via a cable, according to an embodiment. Referring to FIG. 3, the interface apparatus 100 may be connected with the display device 200 via a cable 150. One side of the cable 150 may be connected with the display device 200, and an opposite side may be connected with the interface apparatus 100. The second connector 120 and the cable 150 may be implemented together or separately, and one side of the cable 150 may be connected with the second connector 120 of the interface apparatus 100, as shown in FIG. 2. Alternatively, the cable 150 may be implemented integrated with the second connector 120 and connect the interface apparatus 100 with the display device 200, as shown in FIG. 3.

The first connector 110 and the second connector 120 (or, cable 150) may include a plurality of signal terminals, respectively. For example, the signal terminal may include a universal serial bus (USB) terminal, a high-definition multimedia interface (HDMI) terminal, a display port (DP) terminal, a universal asynchronous receiver/transmitter (UART) terminal, and/or the like. The above-described example is an example embodiment, and the disclosure is not limited to the above-described examples. In an embodiment, the signal terminal may include terminals associated with a Thunderbolt, a LAN, OPTICON, AVI/COMPONENTE VGA/AUDIO, D-Sub, and the like.

The power connector 130 may be connected with the external power supplying device 400. The interface apparatus 100 may provide power provided through the power connector 130 to the electronic device 300 through the first connector 110. For example, the external power supplying device 400 may include an adaptor and convert input AC power to DC power. Then, the external power supplying device 400 may provide the converted DC power to the interface apparatus 100. The interface apparatus 100 may provide DC power supplied from the external power supplying device 400 through the power connector 130 to the electronic device 300 through the first connector 110.

Figure 4:
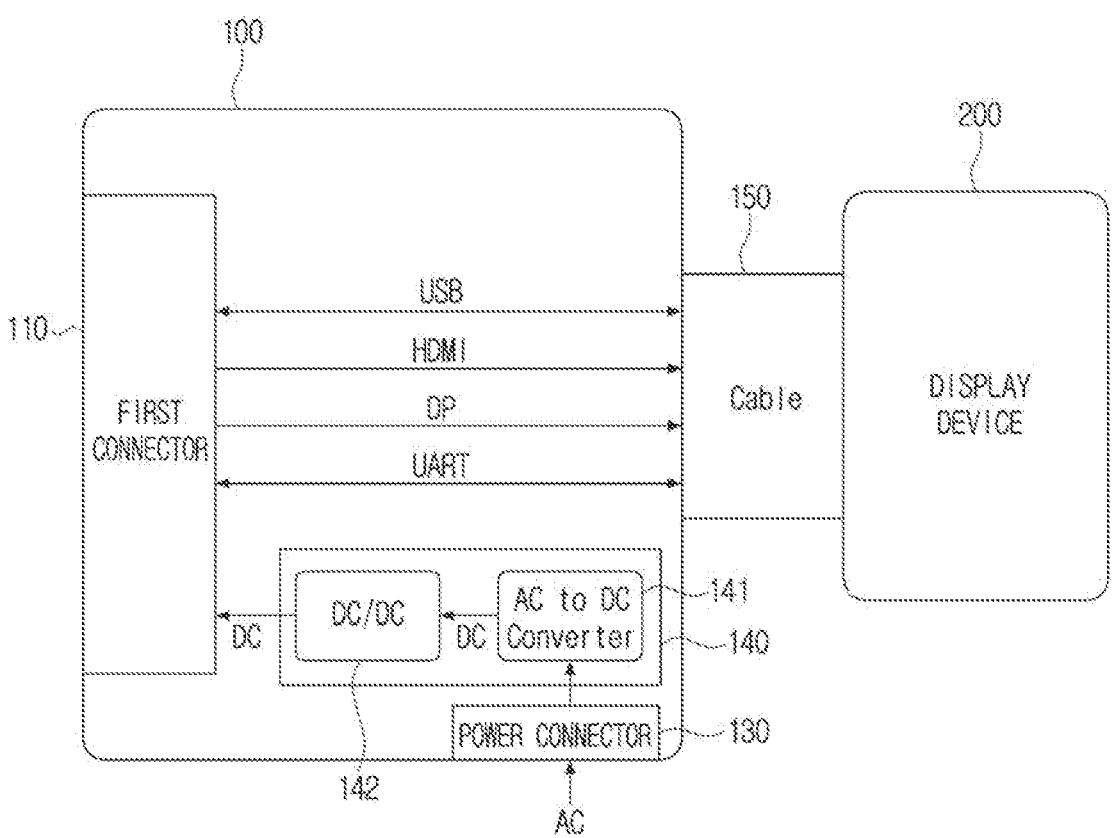
FIG. 4 is a diagram illustrating an interface apparatus including a power supply part, according to an embodiment.

FIG. 4 is a diagram illustrating an interface apparatus including a power supply part, according to an embodiment. Referring to FIG. 4, the interface apparatus including a power supply part 140 is shown as an example. Similar to the above, the interface apparatus 100 may receive power externally through the power connector 130. However, the interface apparatus 100 shown in FIG. 4 may receive AC power externally. The externally provided AC power may be transferred to the power supply part 140.

In an example, the power supply part 140 may include a AC/DC converter 141 and a DC/DC converter 142. The AC/DC converter 141 may convert the transferred AC power to a first direct current power. The converted first direct current power may be transferred to the DC/DC converter 142. The DC/DC converter 142 may convert the transferred first direct current power to a second direct current power of a pre-set voltage level. The interface apparatus 100 may provide the converted second direct current power to the electronic device 300 through the first connector 110. For example, the voltage level of the second direct current power may be a voltage level according to an OPS standard. The power supply part 140 may include a rectifying circuit, a smoothing circuit, a power factor correction (PFC) circuit, and the like. The first connector 110, the second connector 120 (or, cable 150), and the signal terminal may be the same as described above.

Alternatively, the interface apparatus 100 may receive input of AC power through the display device 200.

Figure 5A:
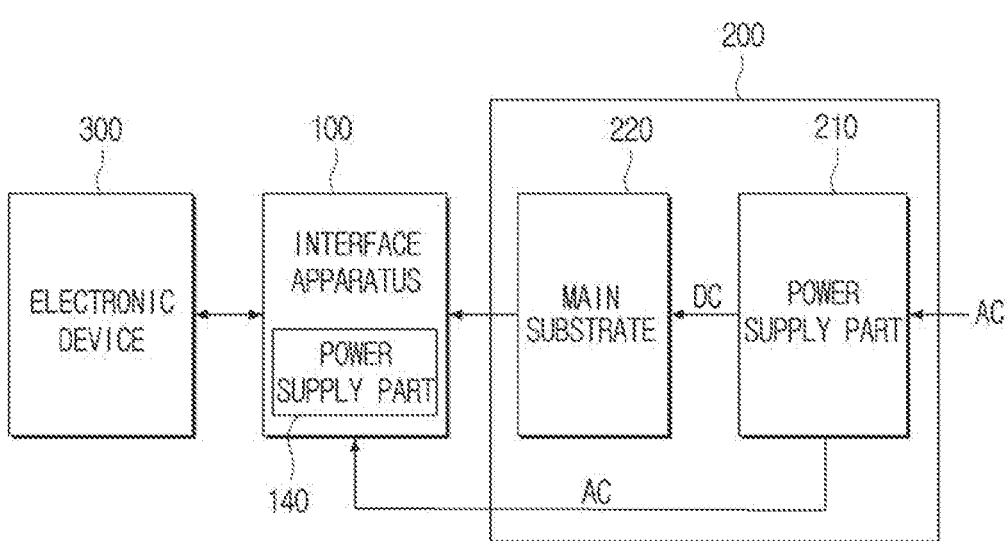
FIGS. 5A and 5B are diagrams illustrating an interface apparatus that receives an input of alternating current (AC) power through a display device, according to an embodiment.
Figure 5B:
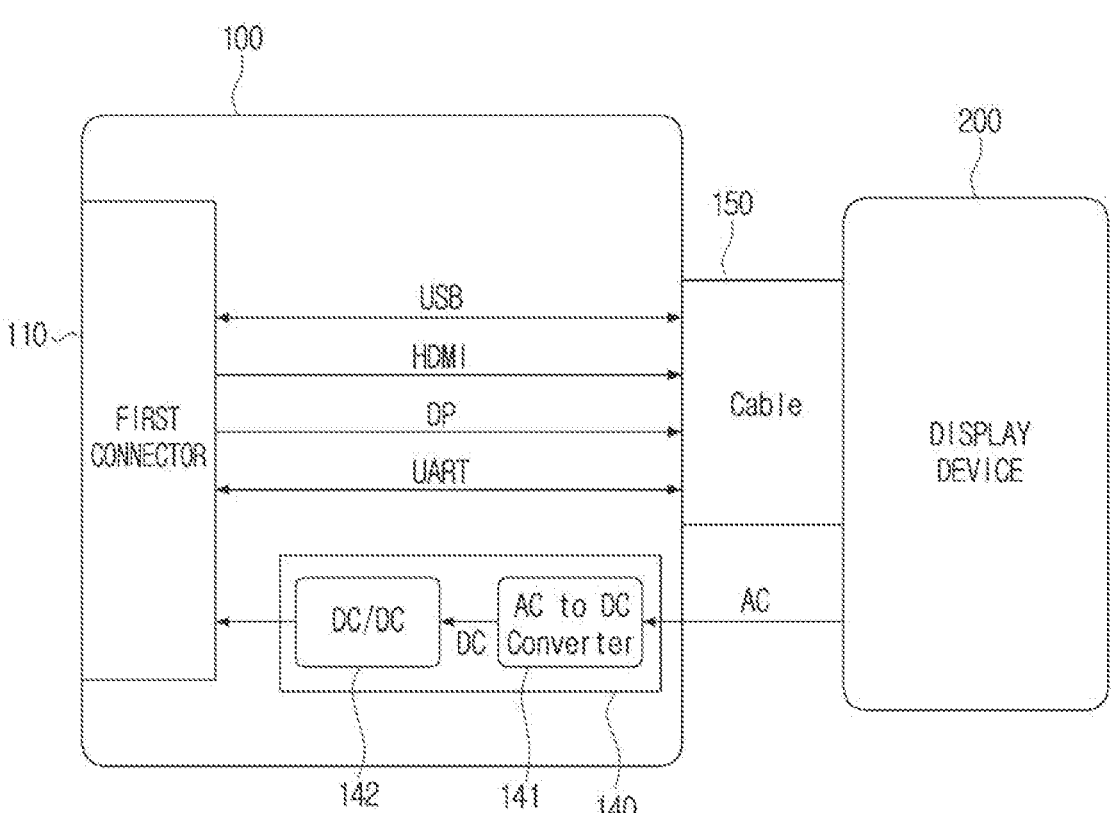

Referring to FIGS. 5A and 5B, the interface apparatus 100 which receives input of AC power through the display device 200 is shown as an example.

FIGS. 5A and 5B are diagrams illustrating an interface apparatus that receives an input of alternating current (AC) power through a display device, according to an embodiment. Referring to FIGS. 5A and 5B, the interface apparatus 100 may be connected with the display device 200 and the electronic device 300. Similar to the above, the interface apparatus 100 may be connected with the electronic device 300 through the first connector 110, and connected with the display device 200 through the second connector 120. Alternatively, the interface apparatus 100 may be connected with the display device 200 through the cable 150. One side of the cable 150 may be connected with the display device 200, and the opposite side may be connected with the interface apparatus 100. The second connector 120 and the cable 150 may be implemented separately, and one side of the cable 150 may be connected with the second connector 120 of the interface apparatus 100. Alternatively, the cable may be implemented integrated with the second connector 120 and connect the interface apparatus 100 with the display device 200. The signal terminal included in the first connector 110 and the second connector 120 (or, cable 150) may be the same as described above.

The interface apparatus 100 may receive AC power externally. In an example, the interface apparatus 100 shown in FIG. 5A and FIG. 5B may receive AC power from the display device 200.

The display device 200 may include a power supply part 210 for driving the display device 200. The display device 200 may receive input of AC power externally and supply power to a main substrate 220 by converting to DC power of a pre-set voltage level using the power supply part 210. The display device 200 may drive the display device 200 using power supplied to the main substrate 220. In addition, the power supply part 210 of the display device 200 may provide power to the interface apparatus 100 by bypassing the externally input AC power. In an example, the display device 200 may provide AC power through the power connector 130 of the interface apparatus 100. Alternatively, the cable 150 that connects with the interface apparatus 100 may include a power line. The display device 200 may provide AC power to the interface apparatus 100 through the power line (or, terminal) included in the cable 150. In this case, the cable 150 may include the second connector 120 and the power connector 130. The AC power provided externally may be transferred to the power supply part 140.

The interface apparatus 100 may include the power supply part 140. Similar to the above, the power supply part 140 may include the AC/DC converter 141 and the DC/DC converter 142. The AC/DC converter 141 may convert the transferred AC power to the first direct current power, and the DC/DC converter 142 may convert the transferred first direct current power to the second direct current power of a pre-set voltage level. The interface apparatus 100 may provide the converted second direct current power to the electronic device 300 through the first connector 110. In addition, the power supply part 140 may include the rectifying circuit, the smoothing circuit, the power factor correction (PFC) circuit, and the like.

The DC power converted to a pre-set level from the power supply part 140 of the interface apparatus 100 may be provided to the electronic device 300 through the first connector 110.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An interface apparatus which is attachable to or detachable from a display device, the interface apparatus comprising:

a substrate configured to perform, based on the interface apparatus being mounted to the display device, interfacing of a signal between an electronic device and the display device, wherein the electronic device is attachable to or detachable from the display device, wherein the substrate comprises:

a first connector configured to connect with the electronic device;

a second connector configured to connect with the display device; and a power connector configured to receive power, wherein the substrate is further configured to provide the power received through the power connector to the electronic device through the first connector, and wherein the power connector is configured to receive the power that bypasses a power conversion path for driving a main substrate of the display device, and wherein the interface apparatus is configured to convert the received power, which is alternating current (AC) power, into a direct current (DC) power having a voltage level compliant with an open pluggable specification, and provide the converted DC power to the electronic device through the first connector.

2. The interface apparatus of claim 1, wherein the substrate further comprises a power supply part, wherein the power supply part comprises:

an alternating current/direct current (AC/DC) converter configured to convert a first current power provided through the power connector to a first direct current power; and a direct current/direct current (DC/DC) converter configured to convert the first direct current power to a second direct current power having a pre-set voltage level, and wherein the substrate is further configured to provide the second direct current power provided from the power supply part to the electronic device through the first connector.

3. The interface apparatus of claim 2, wherein the power supply part is configured to receive the first current power from a display power supply part in the display device through the power connector.

4. The interface apparatus of claim 3, wherein the first current power provided from the display power supply part is current power that is bypassed from the display power supply part.

5. The interface apparatus of claim 1, wherein each of the first connector and the second connector comprises at least one from among a universal serial bus (USB) terminal, a high-definition multimedia interface (HDMI) terminal, a display port (DP) terminal, and a universal asynchronous receiver/transmitter (UART) terminal.

6. The interface apparatus of claim 1, wherein the second connector is configured to connect with the display device through a cable.

7. An interface apparatus comprising:

a first connector configured to connect with an electronic device;

a second connector configured to connect with a display device; and a power connector, wherein the interface apparatus is configured to:

based on identifying the interface apparatus is connected to the display device and the electronic device, perform an interfacing of a signal between the electronic device and the display device; and provide power received by the power connector to the electronic device through the first connector, wherein the power connector is configured to receive the power that bypasses a power conversion path for driving a main substrate of the display device, and wherein the interface apparatus is configured to convert the received power, which is alternating current (AC) power, into a direct current (DC) power having a voltage level compliant with an open pluggable specification, and provide the converted DC power to the electronic device through the first connector.

8. The interface apparatus of claim 7, wherein the second connector is a cable.

9. The interface apparatus of claim 7, wherein the first connector and the second connector are connected using at least one from among universal serial bus, high-definition multimedia interface, a display port, and a universal asynchronous receiver/transmitter.

* * * * *